United States Patent [19]

Kakinami et al.

[11] Patent Number: 4,614,248
[45] Date of Patent: Sep. 30, 1986

[54] MOTOR-DRIVEN POWER STEERING SYSTEM HAVING A STABLE OUTPUT TORQUE

[75] Inventors: Toshiaki Kakinami, Kawasaki; Tomio Yasuda, Kasukabe, both of Japan

[73] Assignee: Aisin Seiki Kabushiki Kaisha, Japan

[21] Appl. No.: 638,668

[22] Filed: Aug. 8, 1984

[30] Foreign Application Priority Data

Aug. 8, 1983 [JP] Japan .................. 58-144797

[51] Int. Cl.⁴ .................. B62D 5/04; G05D 17/02
[52] U.S. Cl. .................. 180/79.1; 318/434; 318/488; 361/31
[58] Field of Search ............... 180/79.1; 318/434, 455, 318/488; 361/31

[56] References Cited

U.S. PATENT DOCUMENTS

| | | | |
|---|---|---|---|
| 3,983,953 | 10/1976 | Bayle | 180/79.1 |
| 4,066,945 | 3/1976 | Korte, Jr. | |
| 4,246,622 | 1/1981 | Hosoda | 361/31 X |
| 4,290,000 | 9/1981 | Sun | 318/434 X |
| 4,300,081 | 3/1980 | Van Landingham | |
| 4,415,054 | 11/1983 | Drutchas | 180/79.1 |
| 4,471,280 | 9/1984 | Stack | 180/79.1 X |
| 4,530,413 | 7/1985 | Buike | 180/79.1 |
| 4,532,567 | 7/1985 | Kade | 180/79.1 X |

FOREIGN PATENT DOCUMENTS

| | | |
|---|---|---|
| 0124790 | 11/1984 | European Pat. Off. |
| 3236080 | 4/1983 | Fed. Rep. of Germany ..... 180/79.1 |
| 3402332 | 8/1984 | Fed. Rep. of Germany |
| 58-8467 | 1/1983 | Japan .................. 180/79.1 |

Primary Examiner—Robert G. Nilson
Attorney, Agent, or Firm—Banner, Birch, McKie & Beckett

[57] ABSTRACT

An electric motor driven power steering system is provided. The motor is prevented from operating at low torque command levels. After a first predetermined level of command torque is reached, the motor is controlled to generate torque at a predetermined rate less than the torque actually commanded by the vehicle driver. After a second predetermined level of commanded torque is reached, the motor is controlled to generate torque in accordance with the level of torque command. Thus, the phenomenon known as "hunting" and instability of the system at low torque levels are virtually eliminated. The system operates smoothly over its full range of operation and is not affected by rough road surface conditions.

13 Claims, 14 Drawing Figures

4,614,248

MOTOR-DRIVEN POWER STEERING SYSTEM HAVING A STABLE OUTPUT TORQUE

BACKGROUND OF THE INVENTION

The present invention relates generally to the field of power steering systems for motor vehicles and, more particularly, is directed to an improved motor-driven power steering system having a stable output torque.

Power steering systems for motor vehicles are well-known in the prior art. Such systems generate an auxiliary steering force in accordance with steering by the driver and the force thus generated is transmitted to a steering gear which turns the wheels. Most of the power steering systems in use at the present time are actuated by a hydraulic drive. The hydraulic drive is equipped with a control valve, hydraulic cylinder and related structure which generates an auxiliary steering force by moving hydraulic fluid within the cylinder in accordance with steering by the driver.

A significant disadvantage of hydraulic power steering systems, especially in light of the trend toward smaller cars, is that the control valve, hydraulic cylinder and related structure are large in size. The hydraulic lines must also be formed with a small curvature to prevent pressure loss in the system. In the case of vehicles not having a large mounting space in the engine compartment, such as front wheel drive vehicles, these constraints make it difficult to mount hydraulic power steering systems. Hydraulic systems must also be effectively sealed to prevent fluid leakage. Thus, the maintenance and installation of hydraulic power steering systems is quite troublesome.

In order to avoid the above-identified problems, it has been proposed to use an electric motor as the driving means for power steering systems. While motor-driven steering systems represent a significant improvement over hydraulic systems, it has been found that such systems exhibit a phenomenon known as "hunting". Hunting is generally defined as the time delay experienced between the issuance of control commands to a system and the start of the system's response to those commands. Power steering systems known in the prior art, as well as non-assisted steering operations, are also prone to instability at low steering force levels when the steering operation is first initited. The instability is usually transmitted to the driver as an uncomfortable vibration of the steering wheel. Moreover, steering systems known in the prior art are very sensitive to the condition of the road surface. Rough road surfaces also cause vibration to be transmitted to the steering wheel. While it may be possible to reduce such vibrations by adding various dampening devices to the steering system, the responsiveness of the system to the driver's control would be adversely affected.

Accordingly, there is a need in the art for a steering system for motor vehicles, particularly for vehicles having a motor-driven power steering system, which is readily responsive to control commands by the driver with little or no delay and which operates in a smooth and stable manner over its entire range of operation without regard to road surface conditions.

SUMMARY OF THE INVENTION

Accordingly, it is the overall object of the present invention to provide an improved steering system for a motor vehicle.

It is a specific object of the present invention to provide an improved motor-driven power steering system which is readily responsive to driver commands with little or no delay.

It is another specific object of the present invention to provide an improved steering system for a motor vehicle which operates smoothly over its full range of operation.

It is a further specific object of the present invention to provide an improved steering system for a motor vehicle which is not affected by rough road surface conditions.

In accordance with the present invention, control means for the electric motor of the motor-driven power steering system is provided which prevents the motor from operating at low torque command levels. After a first predetermined level of commanded torque is reached, the motor is controlled to generate torque at a predetermined rate less than the torque actually commanded by the vehicle driver. After a second predetermined level of commanded torque is reached, the motor is controlled to generate torque in accordance with the level of torque commanded.

Thus, in the motor-driven power steering system of the present invention, the phenomenon known as "hunting" and instability at low torque levels are virtually eliminated. The system operates smoothly over its full range of operation and is not affected by rough road surface conditions.

DESCRIPTION OF THE PREFERRED EMBODIMENT

Figure 1:
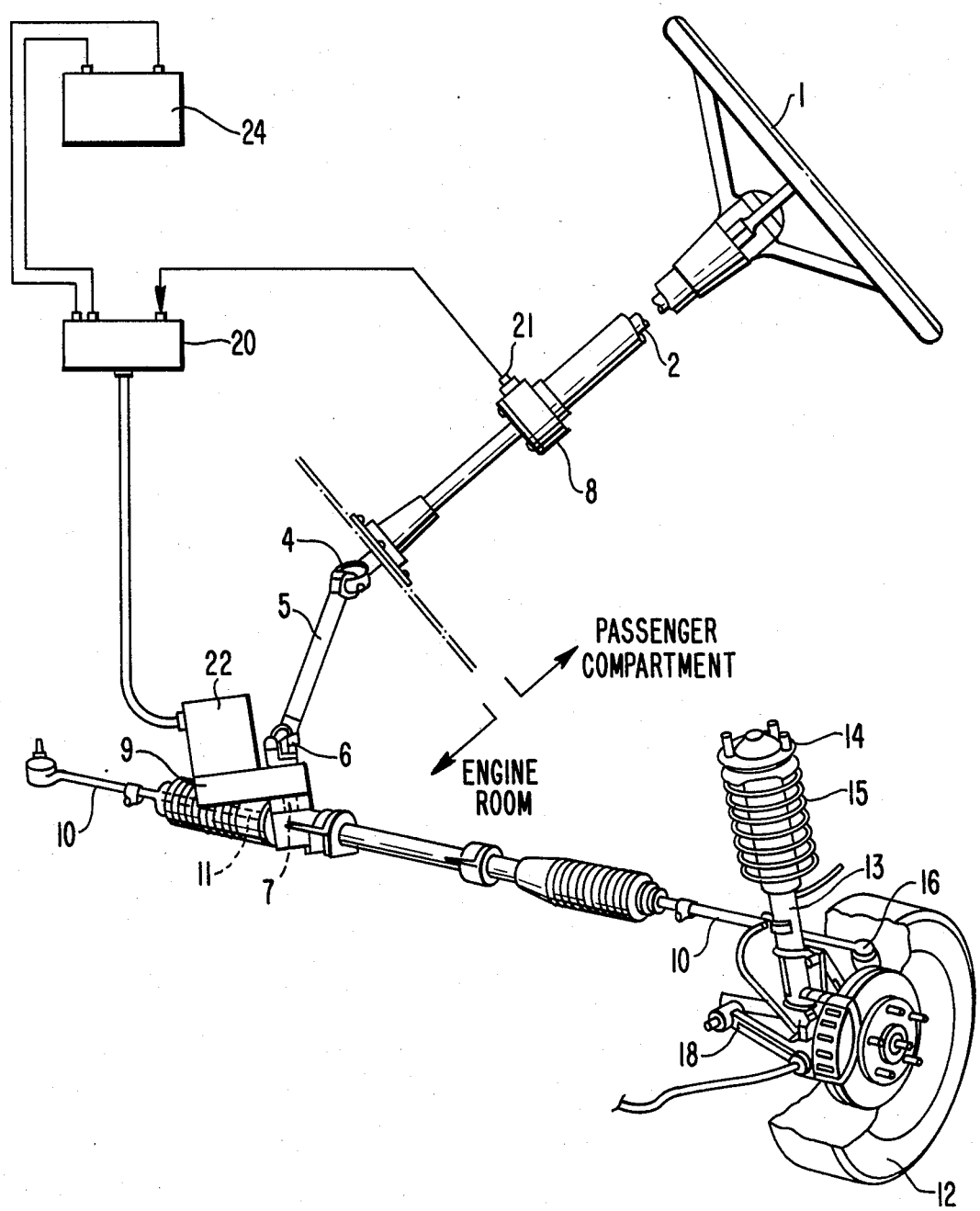
FIG. 1 is a constructional schematic diagram of a power steering system in accordance with the present invention.

With reference to FIG. 1, there is shown a constructional schematic view of an embodiment of a motor-driven power steering system in accordance with the present invention. Steering wheel 1 is connected to one end of first steering shaft 2. The other end of first steering shaft 2 is connected to one end of second steering shaft 5 through first universal joint 4. The other end of second steering shaft 5 is connected to one end of third steering shaft 7 through second universal joint 6. The other end of third steering shaft 7 is attached to a pinion gear (not shown) which engages rack 11. Rack 11 is coupled to tie rod 10 and tie rod 10 is coupled to steerinig knuckle arm 16 for controlling the steering direction of tire 12. Reference numerals 13, 14, 15 and 18 designate a shock absorber, a suspension upper support, a coil spring and a lower suspension arm, respectively.

Torque sensor 8 is attached to first steering shaft 2 and comprises four strain gauges. Output terminal 21 of sensor 8 is connected to controller 20. Controller 20 controls the operation of the steering system as will be presently described.

Between the pinion gear disposed on third steering shaft 7 and second universal joint 6, there is attached torque transmission gear mechanism 9 which couples the steering shaft 7 to the driving shaft of D.C. servomotor 22. Servomotor 22 is electrically coupled to controller 20.

Electrical power for operating controller 20 is provided by battery 24. Battery 24 may be the primary battery of the host vehicle or may be a separate battery dedicated to controller 20.

Figure 2:
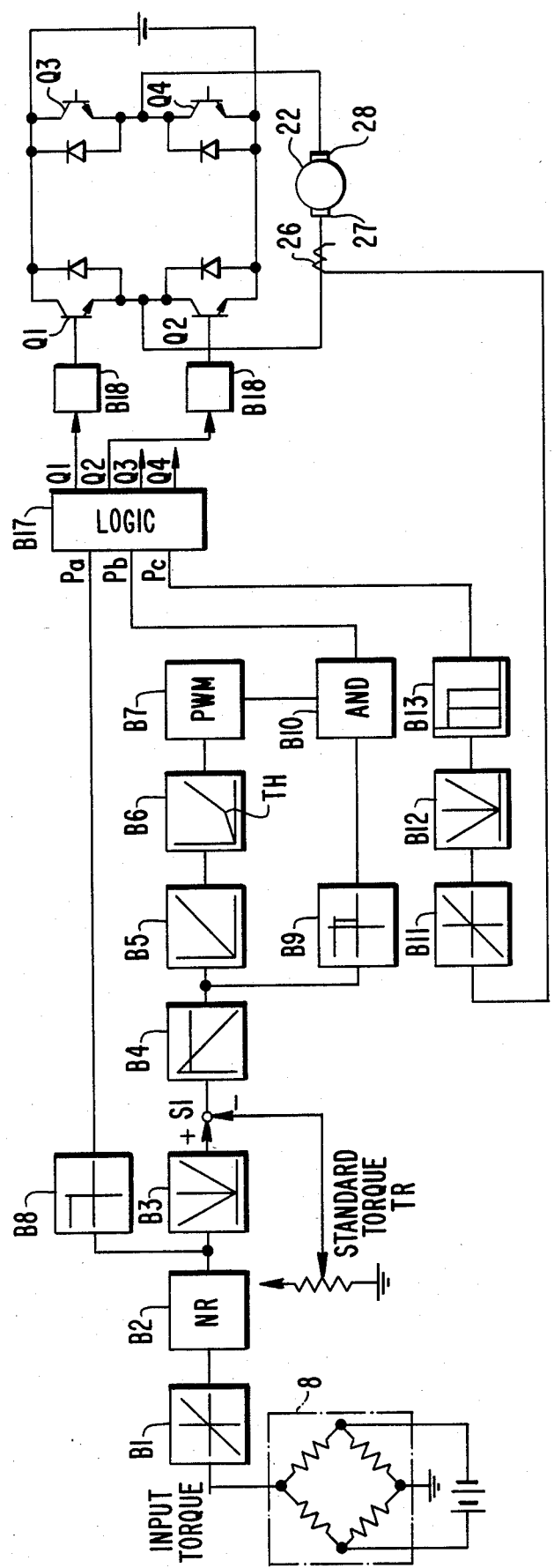
FIG. 2 is a block diagram illustrating the control circuit for the power steering system of FIG. 1.
Figure 3:
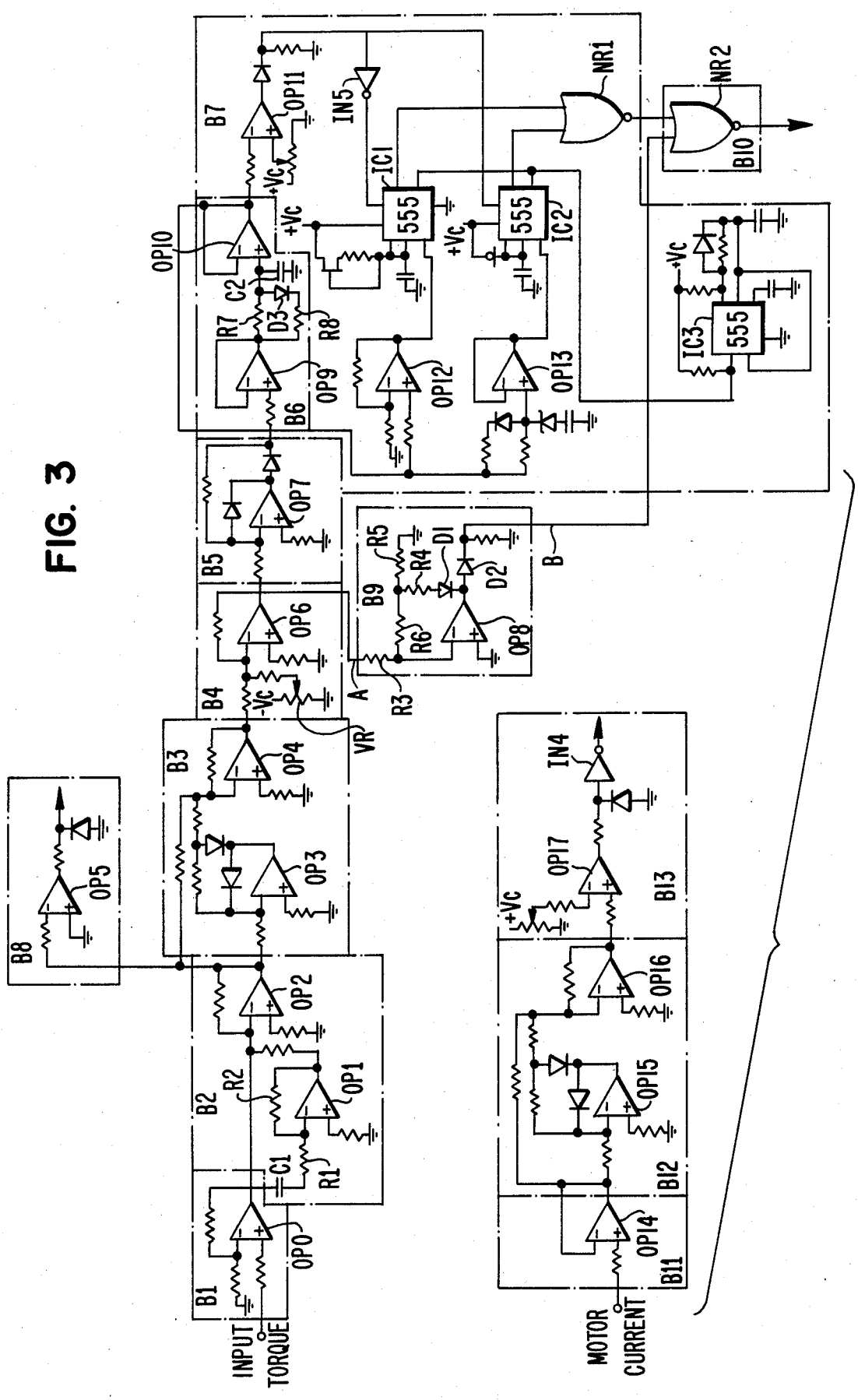
FIGS. 3 and 4 are schematic diagrams illustrating the circuit elements of the blocks in FIG. 2.
Figure 4:
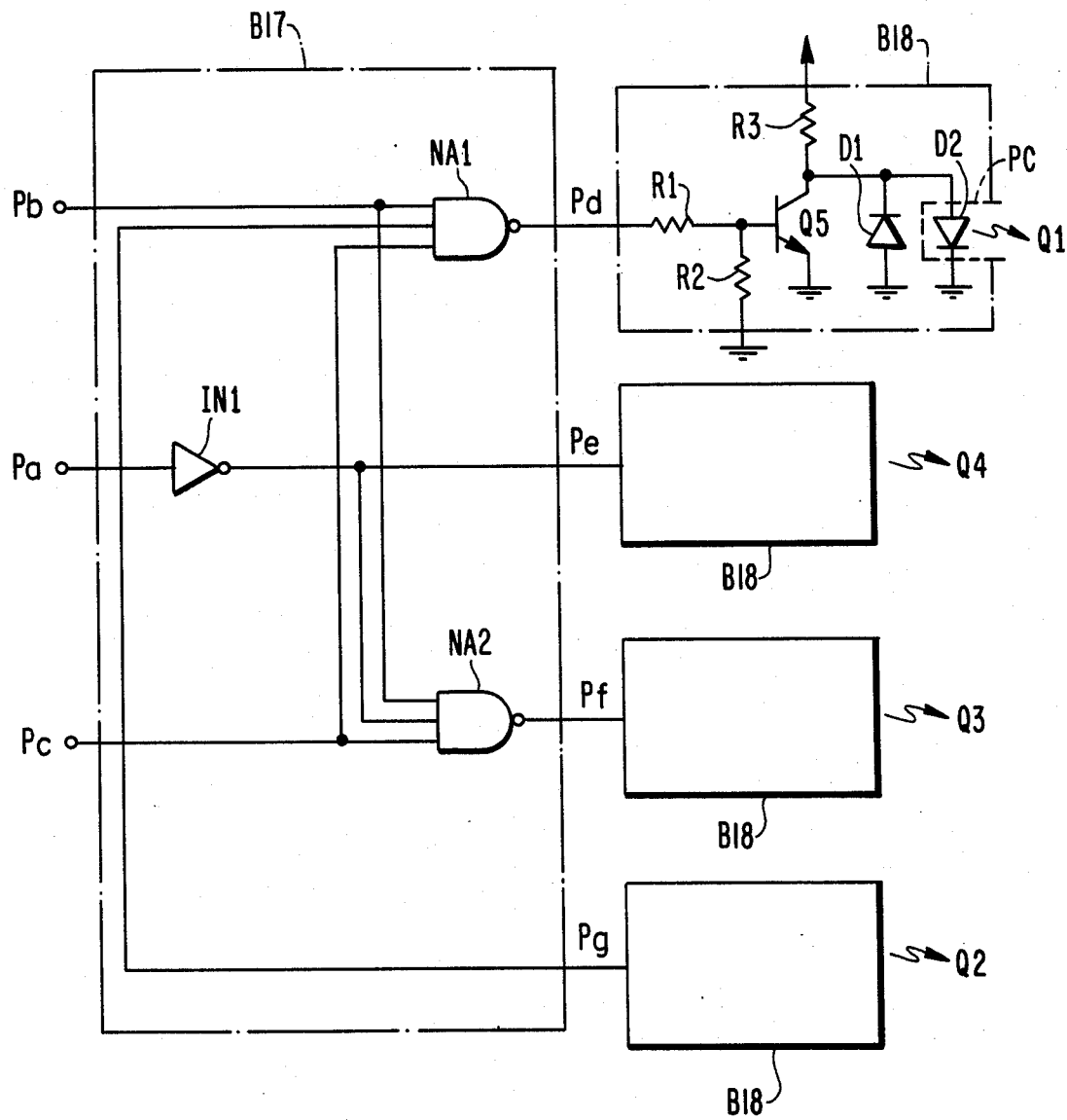

With reference to FIG. 2, there is shown a schematic block diagram illustrating one embodiment of an electrical circuit for controller 20 shown in FIG. 1. FIGS. 3 and 4 show details of the respective blocks in FIG. 2. The graph illustrated in each of the blocks in FIG. 2 show the relationship between the input signal level and the output signal of the associated block. The input signal is plotted along the abscissa and the output signal is plotted along the ordinate. Also note that in the electrical circuit diagrams shown in FIG. 4, a resistor is illustrated by a small rectangular mark.

With reference to FIG. 2, the construction and operation of controller 20 will be described. Torque sensor 8, fixed to first steering shaft 2, forms a bridge circuit with output terminal 21 connected to the input terminal of block B1. Block B1 comprises a linear amplifier with its output terminal connected to block B2. Block B2 is a noise filter and as shown in FIG. 3, the peak portions of the input waveform, i.e., the noise portions, are passed by a time constant circuit comprising resistor R1 and capacitor C1 and are supplied to operational amplifier OP1. OP1 inverts the noise portions and supplies them to operational amplifier OP2 along with the input signal from block B1. The inverted noise portions are additively combined with the signal from block B1 to produce a noise-free signal for amplification by OP2.

The output of OP2 is coupled to the input terminals of blocks B3 and B8. Block B8 comprises an analog comparator which determines the polarity of an input signal thereof and outputs a binary signal based on the determination. Block B3 comprises an absolute value circuit which at all times outputs a positive polarity signal having the same level as that of its input signal regardless of the polarity of its input signal. Therefore, block B8 produces at its output terminal a signal representing the polarity of the manual steering torque applied to first steering shaft 2 (FIG. 1) by a driver while block B3 produces at its output a signal representing the absolute value of the manual steering torque.

The output terminal of block B8 is connected to input terminal Pa of block B17. Block B17 is a logic circuit which will be described in detail below. The output terminal of block B3 is coupled to the input terminal of differential amplifer S1. A signal indicating a predetermined level of torque TR, as established by variable resistor 30, is also coupled to the input terminal of differential amplifier S1.

The output terminal of differential amplifier S1 is coupled to the input terminal of block B4. Block B4 comprises an inverting amplifier, the output terminal of which is coupled to the input terminals of block B5 and block B9. Block 5 comprises an amplifier with a rectifier, the output terminal of which is coupled to the input of block B6. Block B6 comprises a non-linear compensating circuit, the output of which is coupled to a pulse width modulating circuit in block B7. The output of block B7 is coupled to one input of a logic AND circuit in block B10. Block B9 is an analog comparator, the output of which is coupled to the second input of the AND gate in block B10.

In the present invention, the current flowing through D.C. servomotor 22 is repetitiously switched on and off at a predetermined duty cycle. The duty cycle is varied to adjust the torque generated by the servomotor. Block B7 comprises a pulse width modulation (PWM) circuit for controlling the duty cycle of servomotor 22. This PWM circuit modulates the pulse width of a squarewave generated from an oscillator in accordance with the level of the signal received from block B6. Thus, the duty cycle of the signal appearing at the output of block B7 is controlled by the signal received from block B6. The output signal from block B7 is logically ANDed with the output signal from block B9 in block B10. The output of block B10 is coupled to input terminal Pb of block B17.

Block B17 is set forth in more detail in FIG. 4. As shown, block B17 comprises a logic circuit having invertor IN1 and NAND gates NA1 and NA2. These logic elements operate in conventional fashion whereas the logic level at the input of invertor IN1 is inverted at its output and NAND gates NA1 and NA2 provide a logic LO (low level) at their outputs only when all of their inputs are at a logic HI (high level). Block B17 also includes input terminals Pa, Pb and Pc and output terminals Pd, Pe, Pf and Pg.

The output terminals of block B17 are coupled to respective drivers B18. Each driver is identical in construction and comprise resistors R1, R2 and R3, transistor Q5 and diodes D1 and D2. Diode D2 forms part of a photo coupler which couples drivers B18 to respective base electrodes of transistors Q1 through Q4 as shown in FIG. 2. Transistors Q1 through Q4 are used to control servomotor 22 as will be described presently.

Again with reference to FIG. 2, current detector 26 is a current transformer connected to measure the level of current flow through servomotor 22. The output of detector 26 is coupled to block B11. Block B11 comprises a linear amplifier, the output of which is coupled to the input terminal of block B12. Block B12 comprises an absolute value circuit, i.e., the same as block B3.

The output terminal of block B12 is coupled to block B13. Block B13 comprises an analog comparator which has a hysterisis characteristic which prevents an overflow of current through servomotor 22. An excessive flow of current will cause the servomotor to overheat and lead to premature burn out. Thus, the level of current flow through the servomotor provides an indication of motor temperature. When the current flow exceed a predetermined value, the output of the comparator supplies a logic LO to input terminal Pc of block B17, thus causing an interruption in the flow of current to servomotor 22 as will be described below.

The operation of the logic circuit in block B17 will now be described with reference to FIGS. 2 and 4. As discussed above, the logic circuit includes logic inputs Pa, Pb and Pc. Input Pa is coupled from the output of block B8 which is a logic HI or LO depending on the direction of system torque, i.e., whether the steering wheel is being turned to the left or to the right. Input Pb is coupled from the output of block B10 which, when the output signal of block B9 is HI, is a succession of transitions between logic HI and LO at a duty cycle depending on the level of desired output torque of servomotor 22. Input Pc is coupled from the output of block B13 and is also a logic HI or LO depending on the level of current flow through servomotor 22.

For purposes of explanation, it can be assumed that at some point in time, input Pa will be at a logic HI, indicating that system torque is in a first direction; input Pb will be at a logic HI, indicating that servomotor 22 should be "on", and input Pc will also be at a logic HI indicating that the current flow through servomotor 22 is below the predetermined maximum level. Thus, with all inputs at a logic HI, outputs Pd and Pe will be at a logic LO and outputs Pf and Pg will be at a logic HI. Because a logic inversion occurs in drives B18, the logic level presented to the base electrodes of transistors Q1 and Q4 will be HI while the logic level presented to the base electrodes of transistors Q2 and Q3 will be LO. Thus, transistors Q1 and Q4 will be turned on and transistors Q2 and Q3 will be turned off. Accordingly, current from battery 24 flows through transistor Q1 to terminal 27 of servomotor 22, through the servomotor to terminal 28 and through transistor Q4 to the other side of battery 24. Thus servomotor 22 is turned on and will rotate in a first direction, e.g., clockwise. Transistor Q1 will remain in a conductive state until the signal at input terminal Pb changes to a logic LO. When this occurs, the output of NAND gate NA1 becomes HI and the output of its associated B18 driver becomes LO, thus turning off Q1. When Q1 turns off, the current path to servomotor 22 is interrupted, thus causing the motor to slow down. This condition continues until the signal at input terminal Pb changes back to a logic HI. Transistor Q1 is turned on again and current flow is restored to the servomotor. Thus, by varying the duty cycle of the signal at input terminal Pb of block B17, current flow to servomotor 22 is turned on and off to achieve a desired output torque of the servomotor.

Servomotor 22 continues to rotate in a clockwise direction while the signal at input terminal Pa of block B17 is at a logic HI. When this signal changes to a logic LO, indicating that the steering wheel is being turned in the opposite direction, the outputs of the B18 drivers associated with output terminals Pd and Pe will change to a low logic state and the outputs of the B18 drivers associated with output terminals Pf and Pg will change to a high logic state, assuming that inputs Pb and Pc are HI. Therefore, transistors Q1 and Q4 will be turned off and transistors Q2 and Q3 will be turned on. Thus, a current path is established from one side of battery 24, through transistor Q3 to terminal 28 of servomotor 22, through the servomotor to terminal 27, through transistor Q2 and back to the other side of battery 24. Thus, the flow of current through servomotor 22 is now in the reserve direction and the motor will turn in the counterclockwise direction. Therefore, the direction of rotation of servomotor 22 can be changed by changing the logic state of input terminal Pb.

When the flow of current through servomotor 22 exceeds the predetermined level, the logic level at input terminal Pc changes to a logic LO. When this occurs, NAND gates NA1 and NA2 change to a logic HI and their associated drives B18 change to a logic LO. Thus, transistors Q1 and Q3 are turned off. Therefore, the flow of current to servomotor 22 is interrupted regardless of the conductive state of transistors Q2 and Q4.

Figure 5:
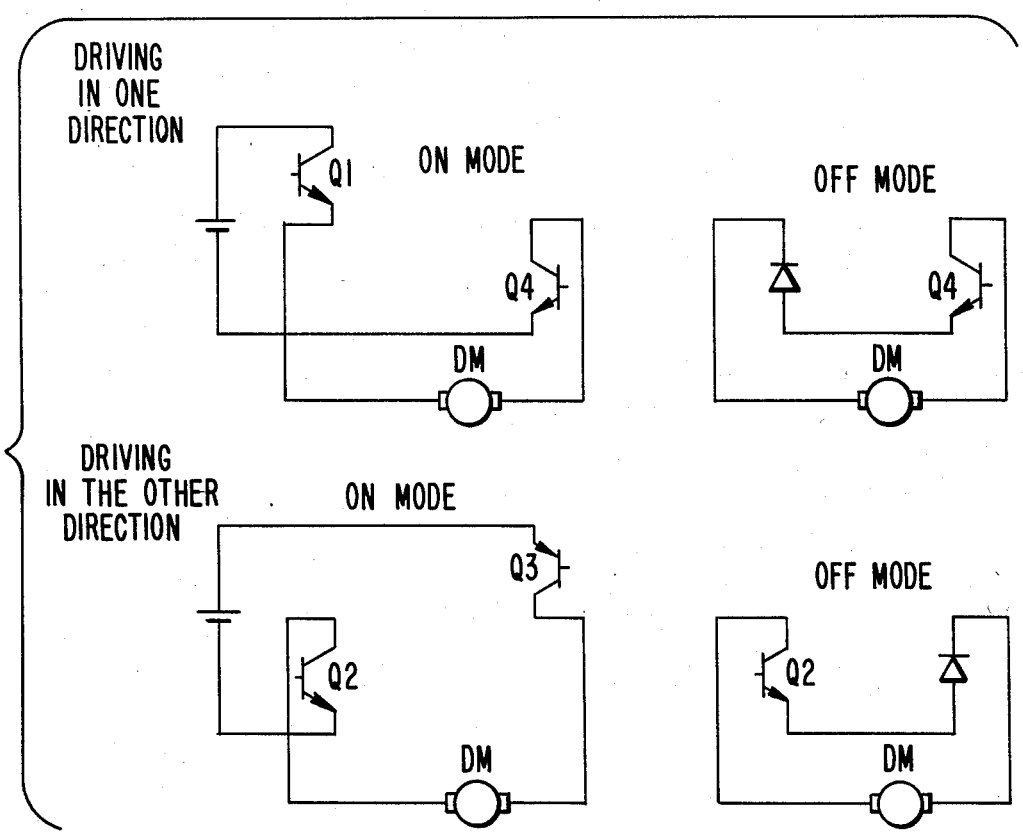
FIG. 5 is a schematic diagram illustrating the transistor drivers associated with each mode of operation of the servomotor used to drive the power steering system of the invention.
Figure 6:
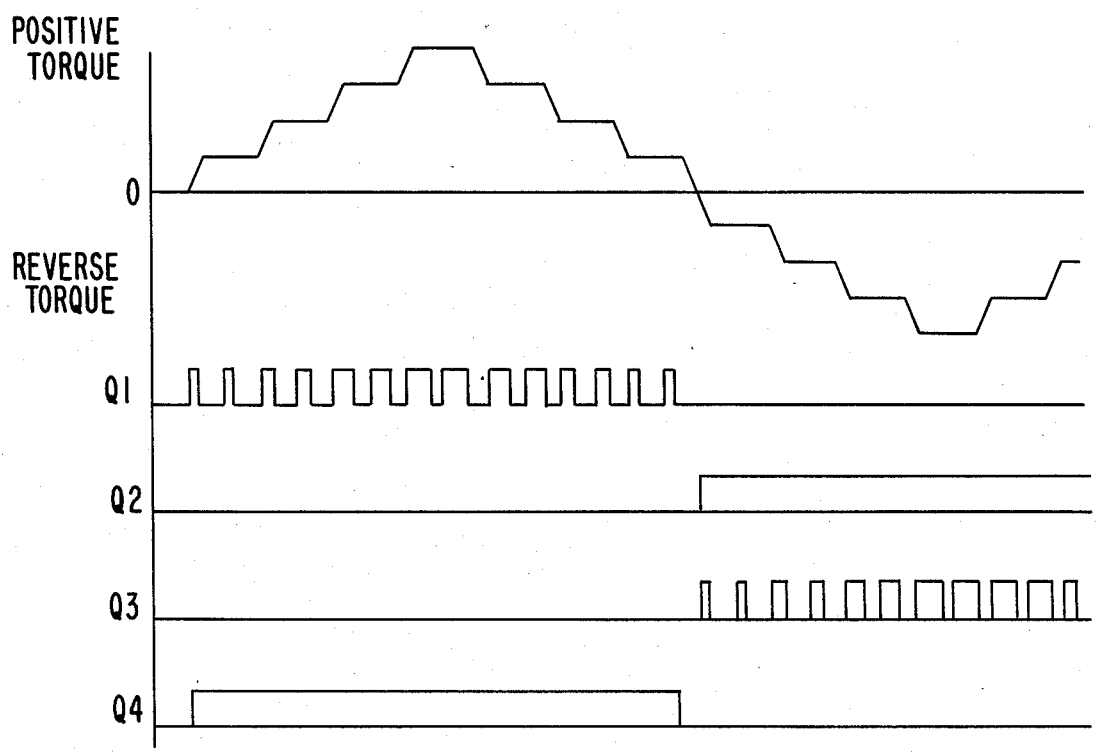
FIG. 6 is a graphical representation of the conductive states of the transistors shown in FIG. 5 with respect to level and polarity of torque.

FIG. 5 is a partial schematic of the driver circuit for servomotor 22 showing which transitors Q1-Q4 are associated with each mode of operation. FIG. 6 illustrates, by graphical representation, the conductive states of transistors Q1-Q4 with respect to level and polarity of torque. Note that at low levels of positive torque, the duty cycle, or "on time" of transistor Q1 is relatively short but increase as the level of torque increases. The duty cycle of transistor Q3 has the same characteristic with respect to negative levels of torque.

The operation of the power steering system in accordance with the present invention will now be described with reference again to FIG. 2. When the vehicle driver turns the steering wheel, servomotor 22 is driven by controller 20 to assist the steering operation of the vehicle. The amount of torque that the motor is to produce is determined by the amount of torque input to the system by the driver.

The input torque is detected by torque detector 8, amplified by block B1 and is processed by a noise filter in block B2 to remove any noise on the signal. The signal is further processed by block B8 to determine its polarity, i.e., direction, and by block B3 to determine its absolute value level TI. The absolute value signal TI is then added to predetermined torque signal TR established by variable resistor 30. The combined signal is supplied to an inverting amplifier in block B4. The input terminal to the amplifier receives a positive signal TI, indicating input torque, and a negative signal TR, indicating the predetermined torque. The level of the output signal from the amplifier in block B4 is given by the relationship:

$$(TI-TR)*K$$

where: K is amplifier gain.

If TI is larger than TR, the polarity of the output signal from block B4 is negative due to the inverting function of the amplifier and if TI is smaller than TR, the polarity of the output signal is positive. The output signal from block B4 is supplied to block B5. Because block B5 includes a rectifier, the output of block B5 is 0 when its input signal is positive, i.e., when TI is smaller than TR. When TI is greater than TR, the output of block B5 a predetermined level dependent on the level of the signal at its input. The signal from block B4 is also coupled to the input of a comparator in block B9.

Figure 7:
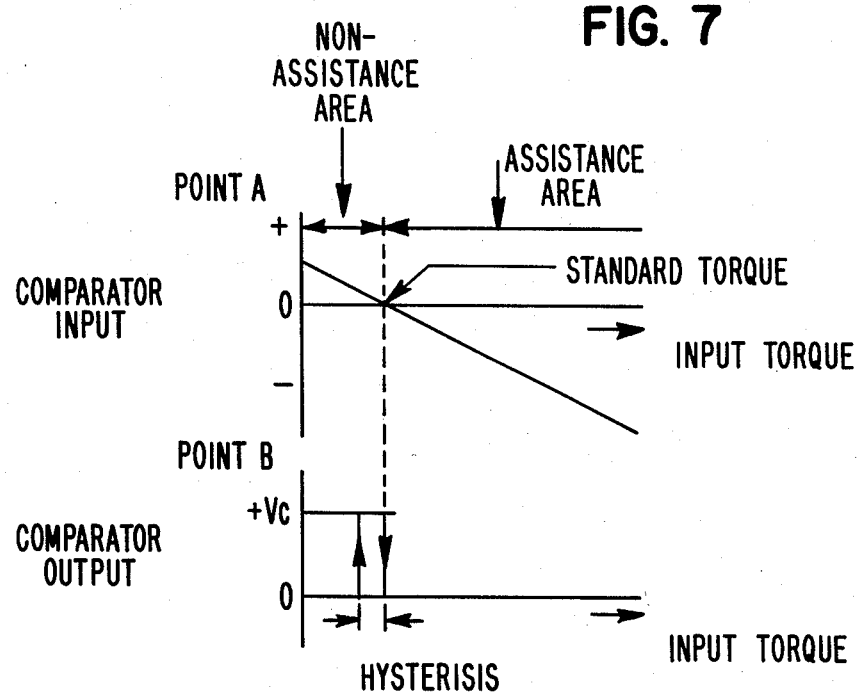
FIG. 7 is a graphical representation of a comparison between the torque input to the steering system and a predetermined torque and the operation of an associated comparator circuit.

As shown in FIG. 7, when input torque TI increases from 0 to a higher level, the input signal level at the comparator in block B9 decreases from a positive value and reaches 0 at predetermined level of input torque TR. During this period, the output of operational amplifier OP8 of the comparator (See FIG. 3) is at a logic HI. The output level of the comparator changes from HI to LO when input torque TI exceeds predetermined torque TR. When input torque TI decreases below predetermined torque TR, the output of the comparator changes from LO to HI. As discussed above, the output of the comparator in block B9 is coupled to one input of the AND gate in block B10. Thus, where TI is less than TR, the AND gate in block B10 prevents passage of the signal from block B7 to block B17.

Non-linear compensation circuit B6 comprises an integrating circuit and two operational amplifies OP9 and OP10, as shown in FIG. 3. The integrating circuit includes two resistors R7 and R8, capacitor C2 and diode D3. When the input level at block B6 is small, the time constant of the integrating circuit is large and is given by the relationship R7 * C2 because diode D3 is reversed biased and is effectively an open circuit. Thus, as shown by the graph in block B6, the level of the output signal from block B6 initially rises at a slow rate for a corresponding unit rise in the level of the input signal. When the signal at the input of block B6 exceeds a predetermined value TH, however, diode D3 is forwardly biased and its resistance value becomes small. Thus, resistor R8 is effectively connected in parallel with resistor R7, thereby reducing the time constant of the integrating circuit. Thus, the time constant of the integrating circuit becomes (C2*R7*R8)/(R7+R8). As shown by the graph in block B6, the level of the output signal from block B6 rises at a much higher rate than it initially did for the same unit rise in the level of the signal at the input of block B6.

When the driver of the vehicle initiates a steering operation, the signal level at the input of block B6 is initially at zero until input torque TI exceeds predetermined torque TR. When TI exceeds TR, the signal level at the input of block B6 begins to increase from zero. The time constant of the integrating circuit in block B6 is initially large as TI increases beyond TR. Thus, the level of the output signal from block B6 rises at a slow rate for a unit change in input signal level as shown by the graph in block B6. When the input signal at block B6 reaches predetermined level TH, however, the time constant in block B6 becomes small, resulting in a larger rise in the level of the output signal for the same unit rise in input signal level. Because the output of block B6 rises at a slower rate for low input torque levels, servomotor 22 is initially controlled to produce less torque than it would otherwise produce for the same unit increase in the level of the input signal to block B6. This eliminates overloading of the power steering force at the time of initial operation of the system and provides for much smoother steering of the vehicle. When the steering operation reaches a normal stage, the level at the output of block B6 increases at a faster rate and the system operates in a normal manner.

Figure 8:
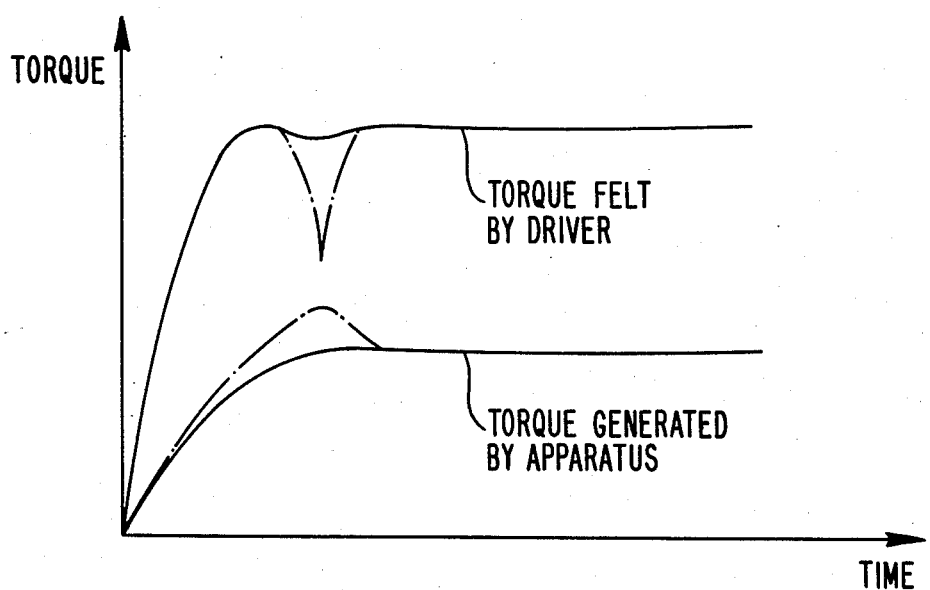
FIG. 8 is a graphical representation of the level of torque generated by the system and the corresponding torque felt by the operator over time.

FIG. 8 indicate a conventional power steering system wherein the assisting torque rises abruptly at the initial stage of the steering operation. Thus, the driver feels a large change in torque. However, by providing block B6 in accordance with the present invention, it is possible to eliminate such an abrupt change of torque so that the driver may not feel the change.

It is usually difficult to design a pulse width modulator which has a 0 output pulse duty cycle or a 100 percent output pulse duty cycle. However, it is important that servomotor 22 not be energized when no input torque is generated. In accordance with the present invention, the output of block B7 is fed to block B17 via block B10. Block B10 comprises a NOR gate, one input of which is coupled to the output of block B7. The other input to the NOR gate is coupled to the output from block B9. Although a NOR gate is used, it functions as an AND gate in the present invention. Thus, when the output of block B9 is HI, the output of the NOR gate is LO regardless of the logic state of its other input. When input torque TI is below predetermined torque TR and, e.g., a signal is generated by block B7 having a 1% duty cycle, such signal will not be passed to logic control circuit B17 until the output level of block B9 becomes LO, allowing the signal to be passed through the AND gate in block B10.

Current detector 26 detects the current flow through servomotor 26. The output signal from detector 26 is fed to input Pc of block B17 through linear amplifier B11, absolute value circuit B12 and analog comparator B13. These blocks prevent an excessive level of current flow through servomotor 22. When such excessive current flows, a logic LO is supplied to input terminal Pc of block B17, thereby stopping the energization of servomotor 22. Normally, the output of block B13 is a logic HI.

The operation of the system in accordance with the present invention will be explained hereinafter with reference to FIGS. 2 and 4. When the driver is not operating the steering wheel, the output of block B3 is zero and the output of block B4 is a positive polarity level. Thus the output of block B9 is a logic HI causing blocks B10 and B17 to maintain servomotor 22 in an inoperative condition. This condition continues until torque TI, i.e., the level of torque input to the system by the driver operating the steering wheel, reaches torque level TR set by variable resister 30. The operator or driver does not feel any torque change from input torque TI equals zero to input torque equals torque TR.

When the input torque exceeds predetermined torque TR, the output of block B4 becomes a negative value and the output of block B5 is also a negative value with a level dependent on the level of output of block B4. The signal is compensated in block B6 and supplied to block B7 which outputs a signal having a duty cycle dependent on the level of input from block B6. Since the output level of block B4 is a negative value, the output of the comparator in block B9 is LO. The logic LO is supplied to one input of the NOR gate in block B10 which operates as an AND gate. Thus, the pulses from block B7 are fed to block B17 which controls servomotor 22. When current flows through servomotor 22, it generates torque which is fed to steering shaft 7 via reduction gear 9. Thus the torsion of steering shaft 7 is reduced which reduces the input torque detected by torque sensor 8. Repetition of this cycle of operation generates an assisting torque by servomotor 22 until the steering or input torque decreases to below predetermined torque TR.

Figure 9A:
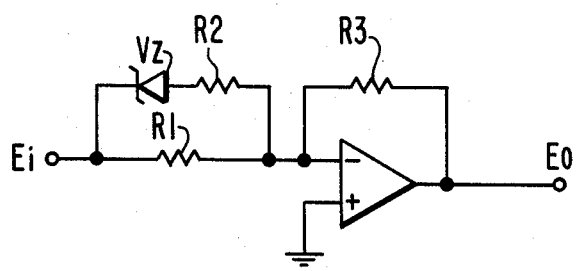
FIGS. 9a, 9b, 10a, 10b, 11a and 11b illustrate other embodiments of the control system for controlling the servomotor.
Figure 9B:
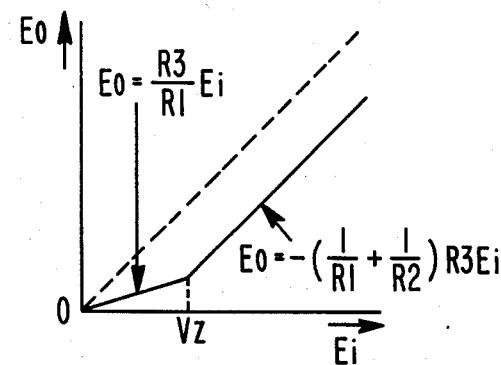
Figure 10A:
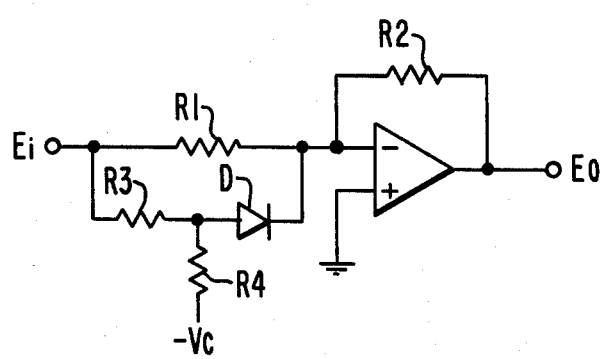
Figure 10B:
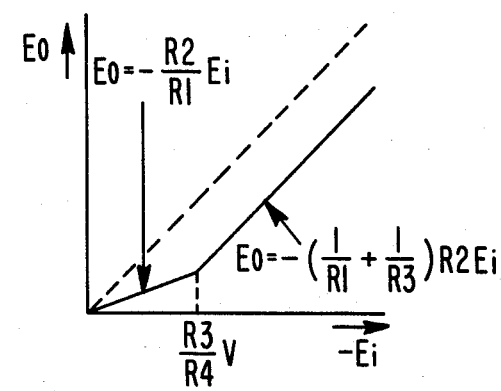

FIGS. 9a and 10a illustrate alternative embodiments for the non-linear compensation circuit in block B6 and FIGS. 9b and 10b show their associated input and output characteristics. As shown in FIG. 9a a zener diode is used. Zener voltage value Vz is determined in accordance with the desired gain of the operational amplifier. In FIG. 10a, similar characteristics are achieved by using a normal diode D.

Figure 11A:
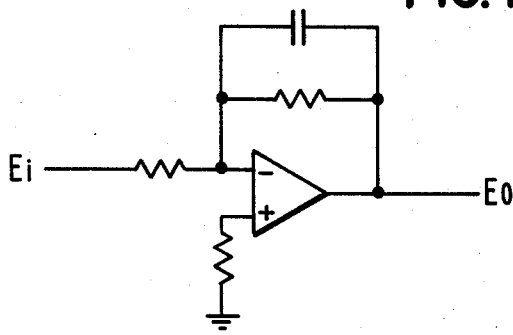
Figure 11B:
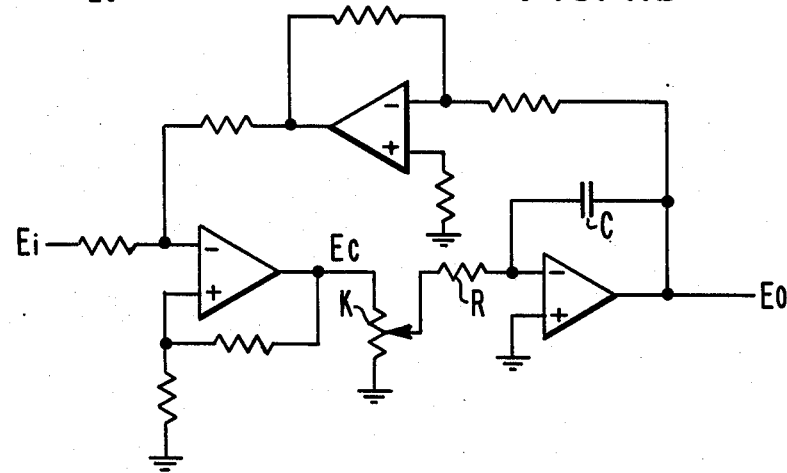

FIGS. 11a and 11b illustrate alternative embodiments for the noise filter in block B2. These circuits include an integrating circuit which eliminates the high or noise portions of the input waveform by integrating the input signal and selecting only the input torque from the output signal of torque sensor 8.

Non-linear compensation circuit B6 of the present invention indicates two characteristic changes defining one preset level. However, is possible to have more than two characteristic changes defining one or more present levels.

The present invention has been described in detail in connection with preferred embodiments. These embodiments, however, are merely for example only and the invention is not restricted thereto. It will be understood by those skilled in the art from a reading of the specification that other variations and modifications can be made within the scope of the present invention as defined by the appended claims.

We claim:

1. An electric power steering device for a vehicle, said device comprising:
    an electric motor;
    coupling means for coupling a steering shaft to said electric motor;
    torque detecting means for detecting the steering torque manually applied to said steering shaft by a driver and producing a steering torque signal corresponding to the steering torque demanded by the driver;
    actuation means for driving said electric motor in response to said steering torque signal;
    compensating means for controlling said actuation means to drive said electric motor at a lesser rate with respect to said steering torque when said steering torque signal is below a first predetermined level than the rate at which said electric motor is driven with respect to said steering torque signal when said steering torque signal is above said first predetermined level, said rate being determined by an integrating circuit; and
    noise filtering means for filtering out noise components from said torque signal, wherein said noise filter includes inverting means for inverting said noise components and adding means for adding said inverting noise components to said torque signal to provide a noise-free torque signal.

2. An electric power steering device for a vehicle in accordance with claim 1, wherein
    said compensating means further controls said actuation means to prohibit drive of said electric motor when said steering torque signal is below a second predetermined level.

3. An electric power steering device in accordance with claim 2 wherein
    said first predetermined level is greater than said second predetermined level.

4. An electric power steering device in accordance with claim 1, said device further comprising:
    current detecting means for detecting the level of current flow through said electric motor and producing a current signal, said actuation means being controlled in response to said current signal to prohibit drive of said electric motor when said current signal exceeds a predetermined level.

5. An electric power steering device in accordance with claim 1, said device further comprising:
    polarity means for detecting the direction of the torque detected by said torque detecting means and producing a polarity signal, said actuation means being controlled in response to said polarity signal to drive said electric motor in a predetermined direction.

6. An electric power steering device for a vehicle in accordance with claim 1 wherein said integrating circuit comprises first and second resistors, a capacitor, and a diode, a first end of said first and second resistors being coupled together to form an input to said integrating circuit and a second end of said first and second resistors being coupled, respectively, across respective ends of said diode, one end of said capacitor being coupled to a 0 reference voltage potential and the other end of said capacitor being coupled to one end of said diode to form an output of said integrating circuit.

7. An electric power steering device for a vehicle in accordance with claim 6 wherein said rate is determined by the relationship $(C * R_1 * R_2)/(R_1 + R_2)$ where:
    $C$ = the value of said capacitor;
    $R_1$ = the value of said first resistor, and
    $R_2$ = the value of said second resistor.

8. An electric power steering device for a vehicle in accordance with claim 7 wherein said compensating means controls said actuation means to drive said electric motor at said lesser rate when said diode is reversed biased.

9. An electric power steering device for a vehicle in accordance with claim 1 wherein said inverting means is an operational amplifier.

10. An electric power steering device for a vehicle in accordance with claim 1 wherein said adding means is an operational amplifier.

11. An electric power steering device for a vehicle in accordance with claim 1 wherein said noise filter means includes integrating means for integrating said torque signal.

12. A method for controlling the motor of an electric power steering system, said method comprising the steps of:
    coupling an actuation means to said electric motor;
    coupling a steering shaft to said electric motor;
    detecting the steering torque manually applied to said steering shaft by a driver and producing a torque signal;
    controlling the power of said actuation means to drive said electric motor at a lesser rate with respect to said steering signal when said steering torque signal is below a first predetermined level than the rate at which said electric motor is driven with respect to said steering signal when said steering torque signal is above said first predetermined level; and
    filtering out noise components from said torque signal by inverting said noise components and adding said noise components to said torque signal to provide a noise-free torque signal.

13. The method of claim 12 further comprising the steps of:
    controlling the power of said actuation means to prohibit drive of said electric motor when said steering torque signal is below a second predetermined level.

* * * * *